United States Patent
Davis et al.

(10) Patent No.: US 12,556,610 B2
(45) Date of Patent: Feb. 17, 2026

(54) DEVICES AND METHODS FOR LOCATION-DEPENDENT PRIORITIZED COMMUNICATION

(71) Applicant: Milwaukee Electric Tool Corporation, Brookfield, WI (US)

(72) Inventors: Anthony M. Davis, Brookfield, WI (US); Johnny Lienau, Glendale, WI (US); Joseph J. Walsh, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 21 days.

(21) Appl. No.: 18/690,162

(22) PCT Filed: Sep. 9, 2022

(86) PCT No.: PCT/US2022/043034
§ 371 (c)(1),
(2) Date: Mar. 7, 2024

(87) PCT Pub. No.: WO2023/039150
PCT Pub. Date: Mar. 16, 2023

(65) Prior Publication Data
US 2024/0388632 A1     Nov. 21, 2024

Related U.S. Application Data

(60) Provisional application No. 63/242,724, filed on Sep. 10, 2021.

(51) Int. Cl.
*H04L 67/125* (2022.01)
*B25F 5/00* (2006.01)
(Continued)

(52) U.S. Cl.
CPC ............. *H04L 67/125* (2013.01); *B25F 5/00* (2013.01); *H04L 67/51* (2022.05); *H04L 69/18* (2013.01)

(58) Field of Classification Search
None
See application file for complete search history.

(56) References Cited

U.S. PATENT DOCUMENTS 8,073,441 B1 * 12/2011 Unger ................... H04W 48/18
                                                                455/435.2
2009/0254203 A1 * 10/2009 Gerold ................ H04L 41/0869
                                                                342/357.41
(Continued)

FOREIGN PATENT DOCUMENTS

CN      110392381 A  * 10/2019  ............ H04W 24/04
JP         5217971 B2 *  6/2013

*Primary Examiner* — Lance Leonard Barry
(74) *Attorney, Agent, or Firm* — Quarles & Brady LLP

(57) ABSTRACT

A power tool and method for prioritized communication is disclosed. A power tool may include an electronic controller including a process and a memory, and a transceiver communicatively coupled to the electronic controller. The electronic controller assigns a first geographic area to a first prioritized set of communication protocols based on a prior successful transmission in the first geographic area using a first communication protocol, determines a power tool location of the power tool within the first geographic area, and identifies a first prioritized set of communication protocols corresponding to the power tool location. The first prioritized set of communication protocols may include two or more communication protocols in a prioritized sequence. Then, the electronic controller transmits, via the transceiver, a communication according to a first communication protocol of the first prioritized set of communication protocols. The first communication protocol may be first in the prioritized sequence.

16 Claims, 7 Drawing Sheets

(51) Int. Cl.
*H04L 67/51* (2022.01)
*H04L 69/18* (2022.01)

(56) References Cited

U.S. PATENT DOCUMENTS

| | | | | |
|---|---|---|---|---|
| 2010/0142505 A1* | 6/2010 | Hansen | ................... | H04L 69/18 |
| | | | | 370/338 |
| 2011/0185011 A1* | 7/2011 | Shuman | ................ | H04L 41/082 |
| | | | | 709/227 |
| 2021/0204175 A1* | 7/2021 | Rangaraju | ........... | H04W 12/037 |

\* cited by examiner

DEVICES AND METHODS FOR LOCATION-DEPENDENT PRIORITIZED COMMUNICATION

RELATED APPLICATIONS

The present application is based on and claims priority from U.S. patent application Ser. No. 63/242,724, filed on Sep. 10, 2021, the entire disclosure of which is incorporated herein by reference.

SUMMARY

Some embodiments of the disclosure provide a power tool device with an electronic controller including a processor and a memory, and a transceiver communicatively coupled to the electronic controller. The electronic controller may be configured to determine a power tool location of the power tool and identify a first prioritized set of communication protocols corresponding to the power tool location. The first prioritized set of communication protocols may include two or more communication protocols in a prioritized sequence. The electronic controller may be further configured to transmit, via the transceiver, a communication according to a first communication protocol of the first prioritized set of communication protocols. The first communication protocol may be first in the prioritized sequence.

Some embodiments of the disclosure provide a method for prioritized communication. The method may include determining a power tool location of the power tool, and identifying a first prioritized set of communication protocols corresponding to the power tool location. The first prioritized set of communication protocols may include two or more communication protocols in a prioritized sequence. The method may further include transmitting a communication according to a first communication protocol of the first prioritized set of communication protocols, the first communication protocol being first in the prioritized sequence.

Some embodiments of the disclosure provide a power tool device with an electronic controller including a processor and a memory, and a transceiver communicatively coupled to the electronic controller. The electronic controller may be configured to transmit, via the transceiver, a communication according to a first communication protocol of a prioritized set. The first communication protocol is first in a prioritized sequence of two or more communication protocols of the prioritized set. The prioritized sequence is based on energy consumption levels corresponding to the two or more communication protocols. The electronic controller may be further configured to, in response to transmission success of the communication, delay transmission of the communication according to a second communication protocol of the prioritized set.

Some embodiments of the disclosure provide a method for prioritized communication. The method includes transmitting, via a transceiver, a communication according to a first communication protocol of a prioritized set. The first communication protocol is first in a prioritized sequence of two or more communication protocols of the prioritized set, and the prioritized sequence is based on energy consumption levels corresponding to the two or more communication protocols. The method further includes, in response to transmission success of the communication, delaying transmission of the communication according to a second communication protocol of the prioritized set.

At least in some embodiments described herein, improved power tool devices and methods are provided that may reduce the time and energy consumption to communicate data.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
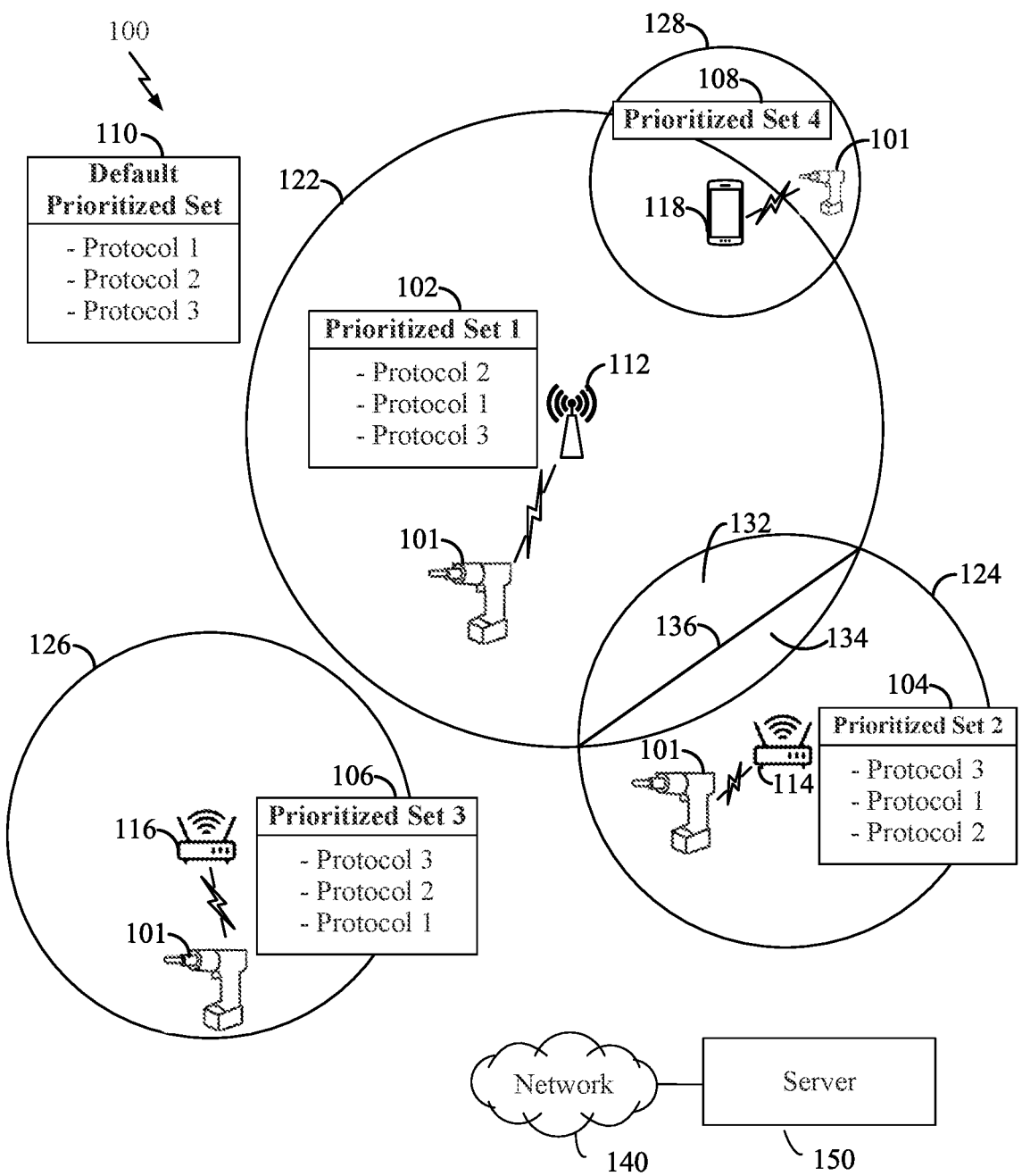
FIG. 1 illustrates a power tool system according to some embodiments.

Some power tools (e.g., an impact driver, a power drill, a hammer drill, a pipe cutter, a sander, a nailer, a grease gun, or any other suitable tool that can send data to another device) may communicate with another device (e.g., a server, a mobile device, another power tool, or any other suitable device that can receive the data) according to a communication protocol. In some examples, a power tool may exploit a short-range wireless communication protocol (e.g., Bluetooth®, infrared (IR), Radio-frequency identification (RFID), ultra-wideband (UWB), ZigBee, or any other suitable communication protocol to connect the power tool to another device). A short-range wireless communication protocol generally enables communication within a range of, for example, less than one hundred feet, less than fifty feet, or less than thirty feet. Different short-range wireless communication protocols might have different ranges of communication. In some examples, a power tool may exploit a medium-range wireless communication protocol (e.g., Wi-Fi or another suitable communication protocol to connect the power tool to another device). A medium-range wireless communication protocol generally enables communication within a range of less than a few hundred feet. In other examples, a power tool may exploit a long-range wireless communication protocol (e.g., cellular, or any other suitable communication protocol to connect the power tool to another device). A long-range wireless communication protocol may allow a power tool to communicate over thousands of feet or miles-wide distances.

Different wireless communication protocols might have different ranges of communication and different levels of power (e.g., battery energy) consumption. In some examples, communication over a long-range wireless communication connection (e.g., using a cellular protocol) consumes more battery energy of a power tool than a short-range wireless communication connection (e.g., using a Bluetooth®, infrared (IR), Radio-frequency identification (RFID), ultra-wideband (UWB), or ZigBee protocol) or a medium-range wireless communication. For example, communication using a cellular protocol (e.g., 3G, 4G, or 5G cellular protocol) that supports communication within several miles consumes more energy than Wi-Fi which allows communication within a few hundred feet. As another example, communication using a medium-range communication protocol (e.g., the Wi-Fi protocol) may consume more battery energy than a short-range communication protocol (e.g., the Bluetooth® protocol). In addition, attempting to communicate using a wireless communication protocol consumes battery energy even if the communication is unsuccessful. Thus, selecting an efficient and less energy-consuming protocol by a multiple-protocol capable device is in need.

Some embodiments described herein provide solutions to these problems by providing improved systems and methods for prioritizing wireless communication protocols depending on the locations of a power tool. In particular, the improved systems and methods increase the chance to successfully send data by using a communication protocol that was successful in communication in the past at a location where the power tool is located. Thus, the improved systems and methods may reduce the time and energy consumption to send data to (or otherwise communicate with) another device (e.g., a cloud server, a mobile device, another power tool, or any other suitable device that can receive the data).

FIG. 1 illustrates a tool system 100 including a power tool 101 according to some embodiments. The power tool 101 may be a motorized power tool or a non-motorized power tool. A motorized power tool may include, for example, a drill-driver, impact driver, hammer drill, table saw, concrete saw, chop saw, miter saw, chainsaw; band saw; reciprocating saw, grinder, sander, pipe threader, crimper, cutter, breaker (jack-hammer), transfer pump, sewer drum machine, drain cleaning air gun, string trimmer, lawn mower, and the like. A non-motorized power tool may include for example, a work light (e.g., a tower light, site light, flood light, spot light, or search light), a work radio, ruggedized tracking device, portable power supply (e.g., powered by at least one power tool battery pack and providing alternating current (AC) and/or direct current (DC) to one or more devices), inspection camera, heated jacket or other heated apparel. In some examples, a non-motorized power tool includes a device that is mechanically and electrically coupled to a power tool battery pack and receives power from the power tool battery pack.

The power tool 101 can include an electronic controller and a transceiver communicatively coupled to the electronic controller. The electronic controller of the power tool 101 may include a processor and a memory. The electronic controller may determine a power tool location of the power tool 101, identify a prioritized set 102, 104, 106, 108 of communication protocols corresponding to the power tool location, and transmit a communication according to a first communication protocol of the prioritized set 102, 104, 106, 108 of communication protocols. The prioritized set 102, 104, 106, 108 of communication protocols may include two or more communication protocols in a prioritized sequence. The first communication protocol may be first in a prioritized sequence of the prioritized set 102, 104, 106, 108. Here, the first communication protocol being first in the prioritized sequence is not necessarily at the first position in the sequence. The communication protocol being first in the prioritized sequence may indicate the highest priority in the sequence and may be a communication protocol in the sequence to be first used to send a communication. In some examples, the communication protocol may be a communication protocol that was successful in communication in the past. Thus, the power tool 101 may exploit a previously successful protocol first to attempt to transmit a communication. This increases the chance for the power tool 101 to successfully communicate with another device and reduces the time and energy consumption for the communication.

In some examples, the tool system 100 further includes one or more of a cellular tower 112, a Wi-Fi router 114 and 116, a mobile device 118 (e.g., a smart phone, a tablet, or laptop), a network 140 and a server 150. The cellular tower 112, Wi-Fi routers 114 and 116, and mobile device 118 are each an example of an access point for the network 140. The cellular tower 112 is an example of a long-range wireless access point. The Wi-Fi routers 114 and 116 are examples of medium-range wireless access points. The mobile device 118 is an example of a short-range wireless access point. Generally, a power tool 101 may communicate with the server 150 via an access point (e.g., the cellular tower 112, Wi-Fi router 114, Wi-Fi router 116, and/or mobile device 118) and the network 140 that is communicatively coupled to both the access point and the server 150.

The server 150 may store tool data for various power tools 101 in the system 100, including configuration data for the power tools 101 (to configure operational parameters of the tools 101), usage data for the power tools 101 (e.g., hours of operation), maintenance data for the power tools 101 (e.g. a log of prior maintenance and/or suggestions for future maintenance), operator/owner information for the power tools 101, location data for the power tools 101 (e.g., for inventory management and tracking), among other data. A power tool 101 within the system 100 may periodically or occasionally attempt to communicate one or more types of tool data back to the server 150, or to otherwise communicate with the server 150 or access points of the system 100. The particular number, types, and locations of components with the system 100 of FIG. 1 are merely used as an example for discussion purposes: additional and/or different types of power tools 101, access points, networks 140, and servers 150 may be present in some embodiments of the system 100.

In some examples, a power tool 101 may have a prioritized set 102, 104, 106, 108 of communication protocols in the memory. In some examples, a prioritized set 102 of communication protocols may include a list of communication protocols in an ordered or prioritized sequence. In other examples, a prioritized set 102 of communication protocols may include a table or array of communication protocols in an ordered or prioritized sequence. A prioritized set 102 of communication protocols may include two or more communication protocols in a prioritized sequence. Thus, when the power tool 101 identifies transmission failure of a communication according to a first communication protocol with the highest priority or first in order of the prioritized sequence, the power tool 101 may transmit the communication according to a second communication protocol that is next in order in the prioritized sequence of the prioritized set 102. Here, the first communication protocol may have a higher priority than the second communication protocol in the prioritized set 102. The first communication protocol may be a communication protocol that was successful in communication in the past. The power tool 101 may consider the transmission of the communication successful when the power tool 101 receives an acknowledgement signal from an access point (e.g., the cellular tower 112, the Wi-Fi router 114, or a mobile device 118), and/or based on an acknowledgement signal from a downstream recipient (e.g., from the server 150 via the network 140 and an access point 112, 114, 118).

In some examples, a power tool 101 may determine the order of a prioritized sequence in a prioritized set of communication protocols based on a prior successful communication history of a communication protocol. Thus, in the example above, the first communication protocol may have a higher priority in the prioritized set than the second communication protocol to send a communication if the first communication protocol was successful in communication in the past. In other examples, each communication protocol in a prioritized set may have a weight considering the total number of successful and/or failed communications in the past using the respective communication protocol. Thus, the power tool 101 may determine the prioritized sequence of the prioritized set of communication protocols based on the weights of the communication protocols. In some instances, the power tool 101 may additionally consider any other suitable factor (e.g., a level of battery energy consumption) to determine a prioritized sequence of a prioritized set of communication protocols. For example, a prioritized set 102 includes three communication protocols (protocol 1, protocol 2, and protocol 3). If protocol 1 and protocol 2 were successful in communication transmission in the past, protocol 2 that consumes less energy than protocol 1 may have a higher priority than protocol 1 in the prioritized set 102 of communication protocols. In other examples, an operator of a power tool 101 may manually set a prioritized sequence of the prioritized set 102 of communication protocols.

In some scenarios, a power tool 101 may update a prioritized sequence in a prioritized set 102 of communication protocols based on a changed successful communication protocol. For example, a first communication protocol that is first in order of a prioritized sequence in a prioritized set 102 of communication protocols may not succeed in transmitting a communication although the communication protocol has a successful transmission history. However, the next communication protocol in the order of the prioritized sequence in the prioritized set 102 of communication protocols may be successful in transmitting the communication. Then, the power tool 101 may update the prioritized sequence in the prioritized set 102 such that the next communication protocol has a higher priority than the first communication protocol. This process may be iterated until the end of the prioritized sequence in the prioritized set 102 or the power tool 101 identifies transmission success of the communication with a respective communication protocol. Thus, the updated prioritized sequence in the prioritized set of communication protocols may reflect recent network environment changes and increases the chance for the power tool 101 to successfully communicate with another device in the future.

In some instances, a power tool 101 may assign an area 122, 124, 126, 128 to a prioritized set 102, 104, 106, 108 of communication protocols. That is, each prioritized set 102, 104, 106, 108 of communication protocols may have a corresponding area 122, 124, 126, 128. In some examples, an area 122 corresponding to a prioritized set 102 of communication protocols may correspond to a communication protocol having the highest priority in the prioritized set 102. The communication protocol corresponding to the area 122 may be a communication protocol that is first in order in the prioritized sequence in the prioritized set 102. Since each communication protocol may have a different coverage range of communication, a respective communication protocol may have a different sized area. Thus, the power tool 101 may determine an area 122 corresponding to a prioritized set 102 of communication protocols based on a communication protocol that is first in order of the prioritized sequence of the prioritized set 102. In some examples, a power tool 101 may have a table or an array in a memory, in which each entry of the table or the array may have area information and a set of prioritized communication protocols corresponding to the area information in a prioritized sequence. In other examples, a power tool 101 may have a table or an array in which each entry may have area information, a communication protocol, and a level of communication protocol's priority. In further examples, a power tool 101 may have a predetermined prioritized set of communication protocols for a predetermined area. For example, a power tool 101 may know a fixed access point (e.g., a cellular tower, a Wi-Fi router, etc.) to consistently support a communication protocol. Then, the power tool 101 may have a predetermined set where the communication protocol supported by the fixed access point is first in order of the prioritized sequence of the predetermined set to be used for first transmitting data.

For example, a power tool 101 may assign area 1 (122) to prioritized set 1 (102). Prioritized set 1 (102) may have a list of communication protocols (protocol 2, protocol 1, and protocol 3) in a prioritized sequence. Protocol 2 has the highest priority in the sequence while protocol 3 has the lowest priority in the sequence. The power tool 101 may determine area 1 (122) based on the type of protocol 2 that is first in order of the prioritized sequence of the prioritized set 1 (102). If protocol 2 is a cellular protocol, the power tool 101 may set area 1 (122) as several miles surrounding a cellular tower 112 or surrounding the location of the power tool 101 at the time of a successful communication with the cellular tower 112. The power tool 101 may also assign area 3 (126) to prioritized set 3 (106). Prioritized set 3 (106) may have a list of communication protocols (protocol 3, protocol 2, and protocol 1) in a prioritized sequence. Area 3 (126) may correspond to the type of protocol 3 that is first in order of the prioritized sequence of the prioritized set 1 (102). If protocol 3 is a Wi-Fi protocol, the power tool may set area 3 (126) as a few hundred feet surrounding a Wi-Fi router 116 or surrounding the location of the power tool 101 at the time of a successful communication with the Wi-Fi router. Area 4 (128) may correspond to the type of protocol 1 that is the first in the order the prioritized sequence of the prioritized set 4 (108). If protocol 1 is a Bluetooth protocol, the power tool may set area 4 (128) as about 30 feet surrounding a successful communication with a mobile device 118 using the Bluetooth protocol.

In some scenarios, two or more areas 122, 124, 128 corresponding to two or more prioritized sets 102, 104, 108 of communication protocols may overlap each other. The overlapping area 132, 134 between the two or more areas 122, 124 may correspond to at least one of: two or more prioritized sets 102, 104 of communication protocols. In some examples, a power tool 101 may determine one or more prioritized sets of communication protocols corresponding to an overlapping area 132, 134 between two or more areas 122, 124 based on midpoints between two or more centers of the two or more areas 122, 124 in the overlapping area 132, 134. For example, area 1 (122) corresponding to prioritized set 1 (102) and area 2 (124) corresponding to prioritized set 2 (104) overlap in an overlapping area 132, 134. Here, midpoints between the center of area 1 (122) and the center of area 2 (124) may constitute an interpolated boundary 136. A first part 132 of the overlapping area 132, 134 close to the center of area 1 (122)

based on the interpolated boundary 136 may correspond to prioritized set 1 (102). On the other hand, a second part 134 of the overlapping area 132, 134 close to the center of area 2 (124) based on the interpolated boundary 136 may correspond to prioritized set 2 (104). However, it should be appreciated that the interpolated boundary 136 is not the only way to assign the overlapping area 132, 134 to one or more prioritized sets 102, 104 of communication protocols.

In some scenarios, an overlapping area 132, 134 between two areas 122, 124 corresponding to two prioritized sets 102, 104 may correspond to one prioritized set of the two prioritized sets where a communication protocol having the highest priority in the prioritized set has a lower battery energy consumption level than the other prioritized set. For example, area 1 (122) corresponds to prioritized set 1 (102) while area 2 (124) corresponds to prioritized set 2 (104). Protocol 2 in prioritized set 1 (102) is first in order in the prioritized sequence and is a cellular protocol. Protocol 3 in prioritized set 2 (102) is first in order in the prioritized sequence and is a Wi-Fi protocol. Since communication using a Wi-Fi protocol generally consumes less battery energy than communication using a cellular protocol, a power tool 101 may assign the whole overlapping area 132, 134 to prioritized set 2 (104). It should be appreciated that these scenarios are mere examples and any other suitable example to assign an overlapping area to one or more prioritized sets may exist.

In some examples, before assigning an area to a prioritized set 102, 104, 106, 108 of communication protocols, a power tool 101 may have a default prioritized set 110 of communication protocols in the memory. A default prioritized set 110 of communication protocols may include two or more communication protocols in a prioritized sequence. A power tool 101 may apply a default prioritized set 110 of communication protocols to all areas in a map initially, or in response to a reset operation. In some examples, a default prioritized set of communication protocols may include two or more communication protocols in a prioritized sequence. In some instances, a power tool 101 may have a default prioritized set 110 of communication protocols in a table or an array in an ordered sequence in a memory of the power tool 101. A power tool 101 may use a communication protocol that is first in order of the prioritized sequence of a default prioritized set for transmitting a communication. In other examples, a power tool 101 may use a default prioritized set 110 if the power tool may not find a prioritized set 102 corresponding to a power tool location.

In some examples, a power tool 101 may determine a power tool location. In some instances, a power tool 101 may include a global navigation satellite system (GNSS) that may calculate the power tool location based on data received from multiple GNSS satellites and/or land-based transmitters. In other instances, a power tool 101 may determine a power tool location based on an access point (e.g., a cellular tower, a Wi-Fi router, etc.). For example, a power tool 101 may know its location by accessing a database or online resource of a cellular tower or a Wi-Fi router that has location data. Alternatively, the power tool 101 may have location data for a cellular tower or a Wi-Fi router and determine a power tool location of the power tool 101 based on the location data of a connected cellular tower or a Wi-Fi router. In other examples, a power tool 101 may determine a power tool location based on a connected mobile device to use a short-range communication protocol (e.g., Bluetooth, Wi-Fi, etc.) via the mobile device.

After determining a power tool location, a power tool 101 may identify a prioritized set of communication protocols corresponding to the power tool location. Since the power tool 101 may assign an area 122, 124, 126, 128 to a prioritized set 102, 104, 106, 108 of communication protocols, the power tool location corresponding to the prioritized set 102, 104, 106, 108 may be within the area 122, 124, 126, 128 assigned to the prioritized set. However, if a power tool 101 may not find a prioritized set 102, 104, 106, 108 for an area 122, 124, 126, 128 corresponding to a power tool location, the power tool 101 may exploit a communication protocol in a default prioritized set 110 to send data to another device. In some examples, the power tool 101 may assign the default prioritized set 110 to a prioritized set 102 corresponding to an area 122 including a power tool location. The power tool 101 may attempt to connect to another device using a communication protocol that is first in order in a prioritized sequence of the prioritized set. When the power tool 101 is connected to an access point (e.g., a cellular tower, a Wi-Fi router, or a mobile device) using the communication protocol, the power tool 101 may obtain the location of the access point by accessing location information of an access point database (accessible through the access point) or obtaining the predetermined location information from a memory of the access point. The power tool 101, then, may set an area with a predetermined coverage distance of the communication protocol surrounding the access point and assign the area to the prioritized set. In other examples, the power tool 101 might not know the access point's location connected to the power tool although the power tool 101 knows the power tool location based on its GNSS. The power tool 101, then, may set an area with a predetermined coverage distance of a successful communication protocol of a prioritized set surrounding the location of the power tool 101 at the time of the successful communication with the access point. The power tool may further assign the area to the prioritized set. In further examples, the power tool 101 may further update the prioritized set 102 that is the same as the default prioritized set 110 such that a communication protocol that is used to determine the power tool location is the first communication protocol or a communication protocol with the highest priority in the prioritized set.

In some scenarios, a power tool 101 may, over time, construct its own map having multiple prioritized sets 102, 104, 106, 108 of communication protocols corresponding to multiple areas 122, 124, 126, 128. Thus, the power tool 101 may exploit one of the multiple prioritized sets corresponding to a power tool location. If the power tool 101 may not find a prioritized set corresponding to a power tool location, the power tool 101 may use a default prioritized set 110 corresponding to the entire map. For example, if the default prioritized set 110 may include protocol 1, protocol 2, and protocol 3 in a prioritized sequence, the power tool 101 may use protocol 1 that has the highest priority in the prioritized set to send data. Even if the power tool 101 identifies a prioritized set corresponding to a power tool location, the power tool 101 may not succeed in transmitting data using a communication protocol that is first in order or with the highest priority in the prioritized set. Then, the power tool 101 may transmit data using the next communication protocol in the order or with the next priority in the prioritized set. If the power tool 101 succeeds in transmitting data using the next communication protocol in the prioritized set, the power tool 101 may update the priority set such that the next (successful) communication protocol has higher priority than the failed communication protocol in the priority set. For example, a prioritized set may include protocol 1, protocol 2, and protocol 3 in a prioritized sequence. When the power tool 101 identifies a transmission failure using protocol 1 and a transmission success using protocol 2, the power tool 101 may update the prioritized set such that protocol 2 has a higher priority than protocol 1 in the prioritized set. Thus, the (updated) prioritized set may include protocol 2, protocol 1, and protocol 3 in a prioritized order.

Figure 2:
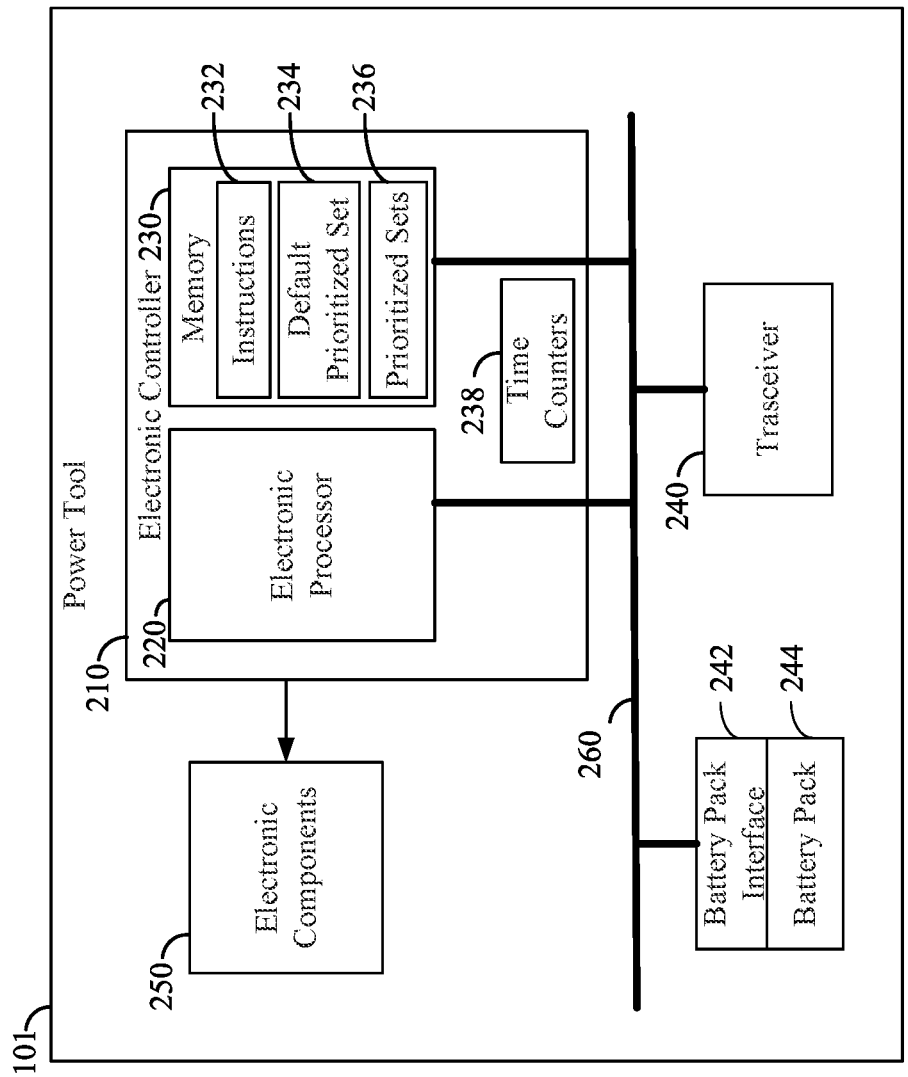
FIG. 2 is a block diagram of a power tool according to some embodiments.

FIG. 2 is a block diagram an example of a power tool 101. In the example illustrated, the power tool 101 may include a device electronic controller 210, a device transceiver 240, and/or electronic components 250. The device electronic controller 210 may include a device electronic processor 220 and a device memory 230. The device electronic processor 220, the device memory 230, and the device transceiver 240 may communicate over one or more control and/or data buses (for example, a device communication bus 260). The electronic processor 220 may be configured to communicate with the memory 230 to store data and retrieve stored data. The electronic processor 220 may be configured to receive instructions and data from the memory 230 and execute, among other things, the instructions. In particular, the electronic processor 220 executes instructions stored in the memory 230. Thus, the electronic controller 210 coupled with the electronic processor 220 and the memory 230 may be configured to perform the methods described herein (e.g., one or more of processes 300, 400, 500, 600, and 700 of FIGS. 3-7).

The memory 230 may include read-only memory (ROM), random access memory (RAM), other non-transitory computer-readable media, or a combination thereof. The memory 230 may include instructions 232 for the electronic processor 220 to execute. The memory 230 may also include a default prioritized set 234 of communication protocols in a prioritized sequence. The memory 230 may also optionally include one or more prioritized sets 236 of communication protocols in a prioritized sequence. Each prioritized set of the one or more prioritized sets 236 may correspond to an area in a map. The default prioritized set may correspond to all areas in the map. The default prioritized set and the one or more prioritized sets may include at least two communication protocols in a prioritized sequence such that a power tool 101 uses a communication protocol that is first in order or with the highest priority in the respective prioritized set to communicate with another device. The default prioritized set and the one or more prioritized sets may be stored in the memory 230 in a table or an array. Each entry of the table or array may include location information and a corresponding prioritized set of communication protocols in a prioritized sequence.

The instructions 232 may include software executable by the electronic processor 220 to enable the electronic controller 210 to, among other things, determine a power tool location of the power tool; identify a first prioritized set of communication protocols corresponding to the power tool location; transmit a communication according to a first communication protocol of the first prioritized set of communication protocols, the first communication protocol being first in the prioritized sequence; identify transmission failure of the communication according to the first communication protocol; transmit the communication according to a second communication protocol of the first prioritized set of communication protocols, the second communication protocol having lower priority than the first communication protocol in the prioritized sequence; identifying transmission success of the communication according to the second communication protocol; update the first prioritized set of communication protocols corresponding to the power tool location such that the second communication protocol has higher priority than the first communication protocol in the first prioritized set of communication protocols corresponding to the power tool location; and/or assign a first area to the first prioritized set of communication protocols based on a location of a successful communication protocol, the successful communication protocol being a same communication protocol as the first communication protocol, the power tool location within the first area.

The electronic controller 210 may further include time counters 238. As explained in further detail with respect to the process 600, each of the time counters 238 may be associated with a particular communication protocol of a prioritized set (e.g., of the default prioritized set 234). In some embodiments, the electronic controller 210 does not include the time counters 238 (e.g., in embodiments in which the electronic controller 210 does not implement the process 600). Although shown separately, in some examples, the electronic processor 220 implements the time counters 238.

The transceiver 240 may be communicatively coupled to the electronic controller 210. The transceiver 240 enables the electronic controller 210 (and, thus, the power tool 101) to communicate with other devices, such as the cellular tower 112, the Wi-Fi router 116, the mobile device 118, and/or other power tools 101. In some examples, the transceiver 240) further includes a GNSS receiver configured to receive signals from GNSS satellites and/or land-based transmitters, determine a location of the power tool 101 from the received signals, and provide the determined location of the power tool 101 to the electronic controller 210.

The transceiver 240 may further be configured to transmit a communication according to a first communication protocol of the first prioritized set 236 of communication protocols, the first communication protocol being first in the prioritized sequence; and/or transmitting the communication according to a second communication protocol of the first prioritized set 236 of communication protocols, the second communication protocol having a lower priority than the first communication protocol in the prioritized sequence.

In some examples, the transceiver 240 may include multiple transceivers, each associated with a particular communication protocol. Each such transceiver may include a driver circuit and an antenna. A driver circuit may receive signals to be transmitted from the electronic controller 210 over a wired connection and drives the antenna to transmit the signals as radio signals according to its associated communication protocol, and/or may receive radio signals from external devices via the antenna and provides the received signals to the electronic controller 210 via a wired connection. In some cases, two or more transceivers may share use of an antenna for transmitting and/or receiving radio signals.

In some embodiments, the power tool 101 also optionally includes a power tool battery pack interface 242 that is configured to selectively receive and interface with a power tool interface of a power tool battery pack 244. The pack interface 242 may include one or more power terminals and, in some cases, one or more communication terminals that interface with respective power and/or communication terminals of the power tool interface of the power tool battery pack 244. The power tool battery pack 244 may include one or more battery cells of various chemistries, such as lithium-ion (Li-Ion), nickel cadmium (Ni-Cad), and the like. The power tool battery pack 244 may further selectively latch and unlatch (e.g., with a spring-biased latching mechanism) to the power tool 101 to prevent unintentional detachment.

The power tool battery pack 244 may further include a pack electronic controller (pack controller) including a processor and a memory. The pack controller may be configured similarly to the electronic controller 210 of the power tool 101. The pack controller may be configured to regulate charging and discharging of the battery cells, and/or to communicate with the electronic controller 210. In some embodiments, the power tool battery pack 244 further includes a transceiver, similar to the transceiver 240, coupled to the pack controller via a bus similar to bus 260. Accordingly, the pack controller, and thus the power tool battery pack 244, may be configured to communicate with other devices, such as the cellular tower 112, the Wi-Fi router 116, the mobile device 118, and/or other power tools 101. In some embodiments, the memory of the pack controller may include the instructions 232, the default prioritized set 234, and the prioritized sets 236. Accordingly, in some examples, the power tool battery pack 244 may implement embodiments of the prioritized protocol communications as described herein with respect to the power tool 101. In some examples, the transceiver of the power tool battery pack 244 further includes a GNSS receiver configured to receive signals from GNSS satellites and/or land-based transmitters, determine a location of the power tool 101 from the received signals, and provide the determined location of the power tool 101 to the electronic controller 210.

The power tool battery pack 244 is coupled to and configured to power the various components of the power tool 101, such as the electronic controller 210, the transceiver 240, and the electronic components 250. However, to simplify the illustration, power line connections between the pack 244 and these components are not illustrated.

In some embodiments, the power tool 101 also optionally includes additional electronic components 250. For a motorized power tool (e.g., drill-driver, saw; and the like), the electronic components 250 may include, for example, an inverter bridge, a motor (e.g., brushed or brushless) for driving a tool implement, and the like. For a battery pack, the electronic components 250 may include, for example, one or more battery cells, a charge level fuel gauge, analog front ends, sensors, and the like. For a non-motorized power tool (e.g., a work light, a work radio, ruggedized tracking device, portable power supply, and the like), the electronic components 250 may include, for example, one or more of a lighting element (e.g., an LED), an audio element (e.g., a speaker), a power source, and the like. In some embodiments, the device transceiver 250 may be within a separate housing along with another electronic controller, and that separate housing selectively attaches to the power tool 101, on an outside surface of the power tool 101 or by being inserted into a receptacle of the power tool 101. Accordingly, the wireless communication capabilities of the power tool 101 may reside in part on a selectively attachable communication device, rather than integrated into the power tool 101. Such selectively attachable communication devices may include electrical terminals that engage with reciprocal electrical terminals of the power tool 101 to enable communication between the respective devices and enable the power tool 101 to provide power to the selectively attachable communication device. In other embodiments, the device transceiver 240 may be integrated into the power tool 101.

Figure 3:
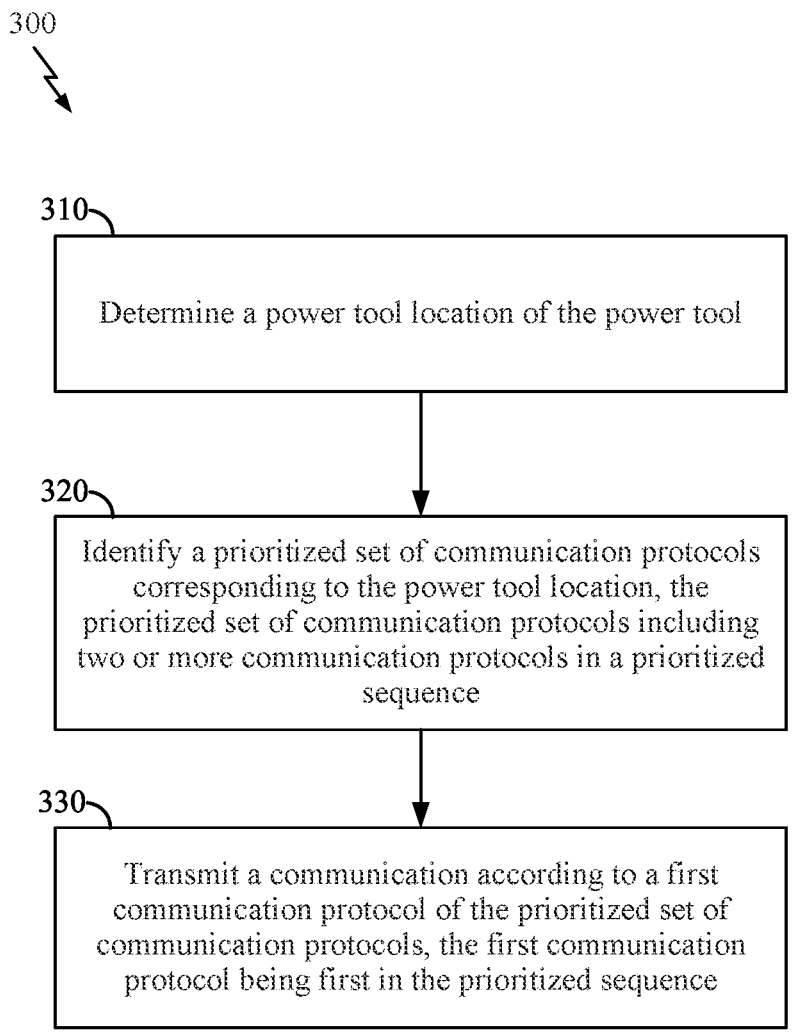
FIG. 3 is a flowchart of a process for location-dependent prioritized communication according to some embodiments.

FIG. 3 illustrates a process 300 for location-dependent prioritized communication. The process 300 is described below as being carried out by the power tool 101. However, in some embodiments, the process 300 is implemented by another system or tool having additional, fewer, and/or alternative components. For example, in some embodiments, the process 300 is implemented by the power tool battery pack 244. Additionally, although the blocks of the process 300 are illustrated in a particular order, in some embodiments, one or more of the blocks may be executed partially or entirely in parallel, may be executed in a different order than illustrated in FIG. 3, or may be bypassed.

In block 310, the electronic controller 210 may be configured to determine a power tool location of the power tool 101. In some examples, the electronic controller 210 may determine a power tool location using the transceiver 240 of the power tool 101. For example, the transceiver 240 may include a GNSS receiver that receives signals from one or more GNSS satellites and/or land-based transmitters. The GNSS receiver may determine its location, and thus, the power tool location, based on the received signals using standard GNSS techniques. The GNSS receiver may then provide the power tool location to the electronic controller 210.

In other examples, the electronic controller 210 may determine the power tool location of the power tool 101 based on a connection of the transceiver 240 to a fixed access point (e.g., a cellular tower 112 and/or a Wi-Fi router 114). For example, the power tool 101 may be in a location where a Wi-Fi connection is available and connect, via the transceiver 240), to a Wi-Fi router for the Wi-Fi connection. The electronic controller 210 may receive location data for the Wi-Fi router from the Wi-Fi router via the transceiver 240. The electronic controller 210 may use the received location data as the power tool location. In some examples, the electronic controller 210 may communicate with multiple Wi-Fi routers with known locations (i.e., known a priori or communicated to the electronic controller 210 by the routers via the transceiver 240). The electronic controller 210 may then triangulate the power tool location based on, for example, strength of signal or time of flight for signals between the transceiver 240 and the respective Wi-Fi routers. In some examples, instead of Wi-Fi routers, the electronic controller 210 may similarly determine the power tool location based on communications with a cellular tower (that communications its location) or based on a plurality of cellular towers (using triangulation). In some examples, the electronic controller 210 may determine the power tool location based on communications with a plurality of different types of access points (e.g., Wi-Fi routers and cellular towers) using triangulation.

In some examples, the electronic controller 210 may determine the power tool location of the power tool 101 based on a connection of the transceiver 240 to a mobile access point (e.g., a mobile device 118). For example, the mobile device 118 may determine a mobile device location for itself (e.g., using a GNSS receiver of the mobile device 118 or other techniques), and may communicate the mobile device location to the electronic controller 210 via the transceiver 240. The electronic controller 210 may, in turn, use the mobile device location as the power tool location.

In block 320, the electronic controller 210 of the power tool 101 may be further configured to identify a prioritized set of communication protocols corresponding to the power tool location. The prioritized set of communication protocols may include two or more communication protocols in a prioritized sequence. For example, the electronic controller 210 may access a table of prioritized sets of communication protocols (e.g., the prioritized sets 236 of the memory 230). The table may organize the prioritized sets 236 such that each set is associated with a geographic area (see, e.g., areas 122, 124, 126, and 128). The electronic controller 210 may access the table using the power tool location determined in block 310. For example, the electronic controller may compare the power tool location to the geographic areas of the table to determine whether the power tool location is within or matches at least one of the geographic areas. In response to determining that the power tool location is within or matches one of the geographic areas, the electronic controller 210 determines the prioritized set associated with the geographic area. Further, the electronic controller 210 identifies the prioritized set of communication protocols associated with the geographic area as the prioritized set of communication protocols that corresponds to the power tool location.

In some examples, the electronic controller 210 may not find a prioritized set corresponding to a power tool location. For example, electronic controller 210 may determine that the power tool location does not fall within or match a geographic area associated with a prioritized set within the prioritized sets 236. In response, the electronic controller 210 may set a default prioritized set (e.g., default prioritized set 110 of FIG. 1 or 234 of FIG. 2) as the prioritized set corresponding to the power tool location. Such a default prioritized set of communication protocols may include two or more communication protocols in a prioritized sequence that applies to all areas except those geographic areas assigned to corresponding prioritized sets of communication protocols (e.g., except those areas assigned to the prioritized sets 236).

In block 330, the electronic controller 210 of the power tool 101 may be further configured to transmit, via the transceiver 240, a communication according to a communication protocol of the first prioritized set of communication protocols. The communication protocol may be first in the prioritized sequence. The communication protocol that is first in the prioritized sequence may be a communication protocol having the highest priority in the prioritized set of communication protocols. The highest priority may be indicated by a ranking parameter associated with each protocol (e.g., associated in an array or table) or may be indicated implicitly by the position of protocol in an ordered list (e.g., in an array or table). Thus, the power tool 101 may use the communication protocol first in the prioritized set to transmit a communication. As described in further detail below, the communication protocol that has the highest priority may be, for example, the communication protocol that (i) resulted in a prior successful communication in the area associated with the prioritized set, and/or (ii) uses the least power of the communication protocols that resulted in a prior successful communication in the area. Thus, the power tool 101 may increase the chance, reduce the time, and reduce the power to successfully transmit a communication by using the previously successful communication protocol in the first attempt to communicate.

Figure 4:
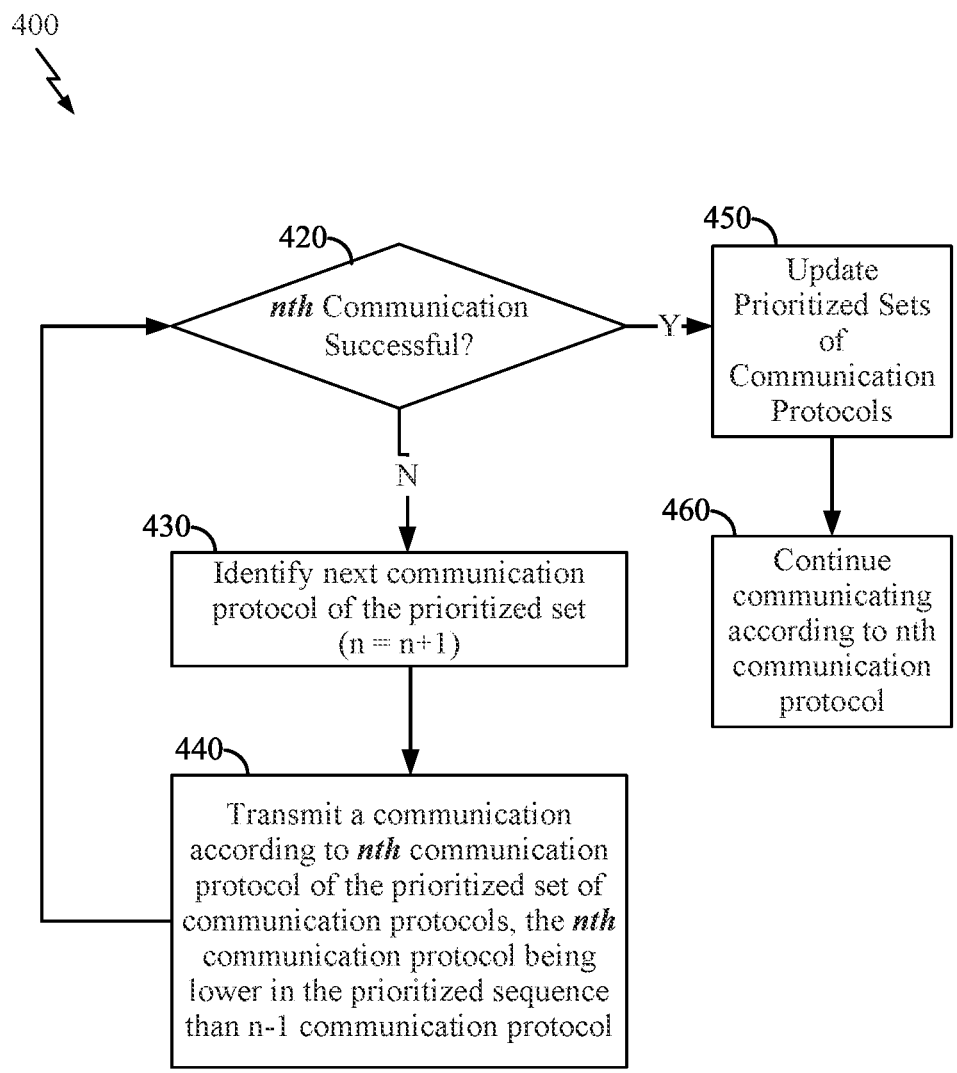
FIG. 4 is a flowchart of a process for communication transmission using a communication protocol in a prioritized set of communication protocols according to some embodiments.

FIG. 4 illustrates a process 400 for transmitting a communication using a communication protocol in a prioritized set of communication protocols. The process 400 is described below as being carried out by the power tool 101. However, in some embodiments, the process 400 is implemented by another system or tool having additional, fewer, and/or alternative components. For example, in some embodiments, the process 400 is implemented by the power tool battery pack 244. Additionally, although the blocks of the process 400 are illustrated in a particular order, in some embodiments, one or more of the blocks may be executed partially or entirely in parallel, may be executed in a different order than illustrated in FIG. 4, or may be bypassed. In some examples, the power tool 101 (or other implementing device) executes the process 400 following execution of the process 300 of FIG. 3. For example, in some embodiments, the electronic controller 210 proceeds to block 420 of FIG. 4 after executing block 330 of FIG. 3.

In block 420, the electronic controller 210 of the power tool 101 may identify whether an nth transmission of a communication was successful. In an initial execution of the block 420, the process 400 may presume that a transmission attempt for the communication already occurred (e.g., through execution of block 330 in the process 300) and that n=1. In block 420, the electronic controller 210 may identify whether the nth transmission of the communication was successful based on whether an acknowledgement signal is received from an intended recipient of the communication. For example, the electronic controller 210 may consider the transmission of the communication successful when the electronic controller 210 receives, via the transceiver 240, an acknowledgement signal from an access point (e.g., the cellular tower 112, the Wi-Fi router 114, or a mobile device 118), and/or based on an acknowledgement signal from a downstream recipient (e.g., from the server 150 via the network 140 and an access point). The acknowledgment signal may be, for example, a dedicated acknowledgment signal or a message including information indicative of an acknowledgement (e.g., information indicating an identity of the recipient device, a request for further information, a successful storage of information, etc.).

When the electronic controller 210 of the power tool 101 identifies transmission success of the communication in block 420, the electronic controller 210 proceeds to block 450. In block 450, the electronic controller 210 updates the prioritized sets of communication protocols 236, as described in further detail below. When the electronic controller 210 of the power tool 101 identifies transmission failure of the communication in block 420, the electronic controller 210 may proceed to block 430.

In block 430, the electronic controller 210 may identify the next communication protocol (n=n+1) of the prioritized set in communication. The prioritized set of communication protocols may have been previously identified based on the power tool location of the power tool 101 (e.g., in block 320 of FIG. 3). The newly identified communication protocol may be lower or have a lower priority in the prioritized sequence of the prioritized set than previously used communication protocol.

In block 440, the electronic controller 210 of the power tool 101 may transmit, via the transceiver 240, the communication according to nth communication protocol of the prioritized set of communication protocols. As noted, the nth communication protocol may be lower or have a lower priority in the prioritized sequence than n−1 communication protocol used in the previous communication attempt. At least in some examples, the communication transmitted in block 440 may include common information that was also in the communication transmitted in block 330 of FIG. 3. Additionally, the communication in block 330 of FIG. 3 and the communication in block 440 of FIG. 4 may each also include protocol specific information. Examples of common information and protocol specific information are described in further detail below.

Then, the electronic controller 210 of the power tool 101 may repeat block 420 to determine whether the transmission of the communication using the nth communication protocol was successful. Accordingly, the electronic controller 210 may loop through blocks 420, 430, and 440 until, in block 420, the electronic controller determines that the transmission of the communication using the nth communication protocol was successful. When the electronic controller 210 of the power tool 101 identifies transmission success of the communication in block 420, the electronic controller 210 proceeds to block 450.

In block 450, the electronic controller 210 updates the prioritized sets of communication protocols 236. The particular update may vary depending on the communication protocol that resulted in the transmission success of the communication, as determined in block 420. For example, when the communication protocol that resulted in transmission success was the highest priority communication protocol in the prioritized set of communication protocols, the electronic controller 210 may update a weight of that communication protocol (e.g., incrementing the total number of successful communications for the communication protocol or otherwise increasing the weight and making it more likely that the successful protocol is used again for a subsequent communication). In some examples, when the communication protocol that resulted in transmission success was the highest priority communication protocol in the prioritized set of communication protocols, the electronic controller 210 may bypass block 450 (e.g., and proceed to block 460). In other words, in some examples, the electronic controller 210 may leave the prioritized set unchanged.

In some examples, in block 450, when the communication protocol that resulted in transmission success was not the highest priority communication protocol in the prioritized set of communication protocols, the electronic controller 210 may reorder the prioritized sequence of communication protocols in the prioritized set. As an example, a prioritized set may include, from highest priority to lowest priority, a Bluetooth protocol, a Wi-Fi protocol, and a cellular protocol, and the electronic controller 210 may determine that the Wi-Fi protocol resulted in transmission success (e.g., on the second transmission attempt after a failed attempt with the Bluetooth protocol). In response, in block 450, the electronic controller 210 may reorder the prioritized set such that the set includes, from highest to lowest priority, the Wi-Fi protocol, the Bluetooth protocol, and the cellular protocol.

In some examples, when the communication protocol that resulted in transmission success was not the highest priority communication protocol in the prioritized set of communication protocols, the electronic controller 210 may update a weight of the attempted communication protocols (e.g., incrementing, as appropriate, the total number of successful and/or failed communications for each communication protocol). Accordingly, depending on the weights of the protocols, a single failed transmission using the highest priority communication protocol may not result in lowering the priority of that communication protocol and reordering the prioritized sequence. Rather, it may take multiple failed attempts using the highest priority protocol before that highest priority protocol is shifted to a lower priority in the prioritized sequence of communication protocols in the prioritized set.

In some examples, the prioritized set applicable during the communication attempts of the process 400 was a default prioritized set (e.g., default prioritized set 234 of FIG. 2). In such examples, to update the prioritized sets 236 in block 450, the electronic controller 210 generates a new prioritized set of communication protocols that is added to the prioritized sets 236. An example technique for generating a new prioritized set is provided with respect to FIG. 5.

In block 460, the electronic controller 210 may continue communicating according to nth communication protocol in the prioritized set of communication protocols. For example, the electronic controller 210 may receive data from the access point or server 150 (e.g., configuration data to configure the power tool 101) or send further data to the access point or server 150 (e.g., usage data or location data for the power tool 101). In some embodiments, the electronic controller 210 bypasses block 460 and the process ends.

Figure 5:
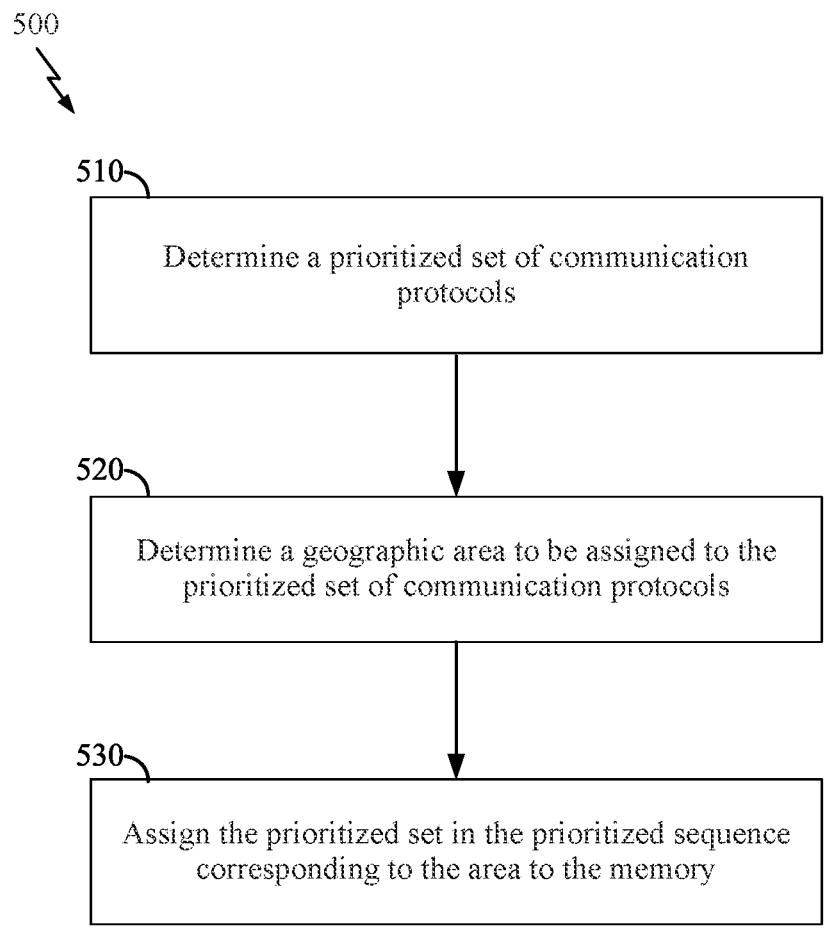
FIG. 5 is a flowchart of a process for generating a prioritized set of communication protocols corresponding to an area according to some embodiments.

FIG. 5 illustrates a process 500 for generating a prioritized set of communication protocols corresponding to an area. The process 500 is described below as being carried out by the power tool 101. However, in some embodiments, the process 500 is implemented by another system or tool having additional, fewer, and/or alternative components. For example, in some embodiments, the process 500 is implemented by the power tool battery pack 244. Additionally, although the blocks of the process 500 are illustrated in a particular order, in some embodiments, one or more of the blocks may be executed partially or entirely in parallel, may be executed in a different order than illustrated in FIG. 5, or may be bypassed. In some examples, the power tool 101 (or other implementing device) executes the process 500 to implement some examples or aspects of block 450 of FIG. 4. For example, when the electronic controller 210 (or other implementing device) communicates, as part of the process 300 or 400, in an area that is not associated with a (non-default) prioritized set of communication protocols, the electronic controller 210 may execute the process 500 to generate a new prioritized set of communication protocols corresponding to the area.

In block 510, the electronic controller 210 of the power tool 101 determines a prioritized set of communication protocols in a prioritized sequence. For example, the electronic controller 210 may assign the communication protocol that the electronic controller 210 used for a successful transmission with the highest priority in the prioritized sequence. The remaining communication protocols that the power tool 101 is configured to use in the prioritized set may then each be assigned a priority in the sequence. These priorities may be assigned according to power usage where, for example, the higher the power per transmission for a protocol, the lower the priority in the sequence. Additionally or alternatively, these priorities may be assigned manually by a user (e.g., based on a ranking that is input via a user interface on a mobile device and communicated to the power tool 101). Additionally or alternatively, these priorities may be assigned based on other factors, such as transmission speed of the communication protocols, latency of the communication protocols, user preferences previously indicated to the electronic controller 210, and the like.

In block 520, the electronic controller 210 determines a geographic area corresponding to the prioritized set of communication protocols. In some examples, the geographic area is a predetermined or fixed size surrounding the access point or power tool location that applies regardless of the communication protocol that has the highest priority in the set. In some examples, the size and shape of the geographic area may be based on the communication protocol identified as having the highest priority in the prioritized sequence of the prioritized set. For example, the larger the communication range of a particular communication protocol, the larger the geographic area that may be assigned to the prioritized set. Thus, for example, the electronic controller 210 may determine the geographic area as several miles surrounding a cellular tower or surrounding the location of the power tool 101 at the time of a successful communication with the cellular tower. In another example, in a prioritized set having the Wi-Fi protocol as the highest priority, the electronic controller 210 may determine the geographic area as one or two hundred feet surrounding a Wi-Fi router or surrounding the location of the power tool 101 at the time of a successful communication with the Wi-Fi router. In another example, in a prioritized set having the Bluetooth protocol as the highest priority, the electronic controller 210 may set the geographic area as a few tens of feet surrounding a Bluetooth communication device or surrounding the location of the power tool 101 at the time of a successful communication with the Bluetooth communication device. In still further examples, the electronic controller 210 may determine the geographic area based on other characteristics of a successful communication, a communication protocol, an area in which the communication occurred, or the like. In still further examples, in block 520, the electronic controller 210 may receive a geographic area (e.g., from the access point with which the power tool 101 had a successful communication or from the server 150) to be assigned to the prioritized set of communication protocols.

In some examples, the electronic controller 210 may determine that the geographic area overlaps with another geographic area already assigned to another prioritized set of communication protocols (a previously assigned area). In some examples, the electronic controller 210 may divide the overlapping area such that a first portion of the overlapping area remains unchanged and assigned to the other prioritized set of communication protocols, and a second portion of the overlapping area is grouped as part of the new geographic area to be assigned to the (new) prioritized set of communication protocols (determined in block 510). For example, the electronic controller 210 may divide the overlapping area based on midpoints between the respective centers of the geographic area and the previously assigned area. Thus, a first portion of the overlapping area that is closer to the center of the previously assigned area may remain assigned to the other prioritized set. On the other hand, a second portion of the overlapping area that is closer to the center of the geographic area may be assigned to the prioritized set determined in block 510. In other examples, the electronic controller 210 may determine that the overlapping area is to remain as previously assigned, or that the overlapping area is to be included in the geographic area to be assigned to the prioritized set determined in block 510. For example, if the prioritized set of block 510 has a highest priority communication protocol with a lower battery energy consumption level than the highest priority communication protocol of the other prioritized set, the electronic controller may reassign the entire overlapping area to the prioritized set determined in block 510. For example, a cellular protocol may be first in order in the prioritized sequence of the other prioritized set, and a Wi-Fi protocol may be first in order in the prioritized set determined in block 510. Since communication using a Wi-Fi protocol generally consumes less battery energy than communication using a cellular protocol, the electronic controller 210 may assign the entire overlapping area to the prioritized set determined in block 510 as part of the geographic area.

In block 530, the electronic controller 210 assign the prioritized set of communication protocols in the prioritized sequence (determined in block 510) to the geographic area (determined in block 520). For example, the electronic controller 210 may store the prioritized set of communication protocols to the memory 230 along with an association to the geographic area (e.g., as part of the prioritized sets 236). By storing the prioritized set along with an association to the geographic area, the electronic controller 210 is also assigning the geographic area to the prioritized set of communication protocols. In some examples, the prioritized set of communication protocols, and assigned geographic area, can be added to a table or array of prioritized sets of communication protocols that make up the prioritized sets 236. In some examples, to store the prioritized set of communication protocols to the memory 230, an identifier for each protocol is stored in a particular order in a table or with a corresponding ranking attribute to identify the sequence of the protocols for the particular prioritized set.

Accordingly, at the time of a subsequent communication by the power tool 101 at or nearby the current location of the power tool 101 (e.g., using the process 300 of FIG. 3), the power tool 101 may use, in a first attempt, the communication protocol that was successfully used in that area. Additionally, over time, the power tool 101 may execute the process 500 multiple times at different geographic locations and continue to add prioritized sets of communication protocols to the memory 230, each assigned to a particular geographic area. As the power tool 101 travels from location to location and communicates (e.g., using the process 300 of FIG. 3), the power tool 101 is configured to identify a communication protocol from a plurality of available communication protocols that, based on the tool's communication history, may be more likely to succeed. Accordingly, over time, the quantity of unsuccessful communications by the power tool 101 can be reduced, saving power, extending battery life, and reducing communication delays.

Figure 6:
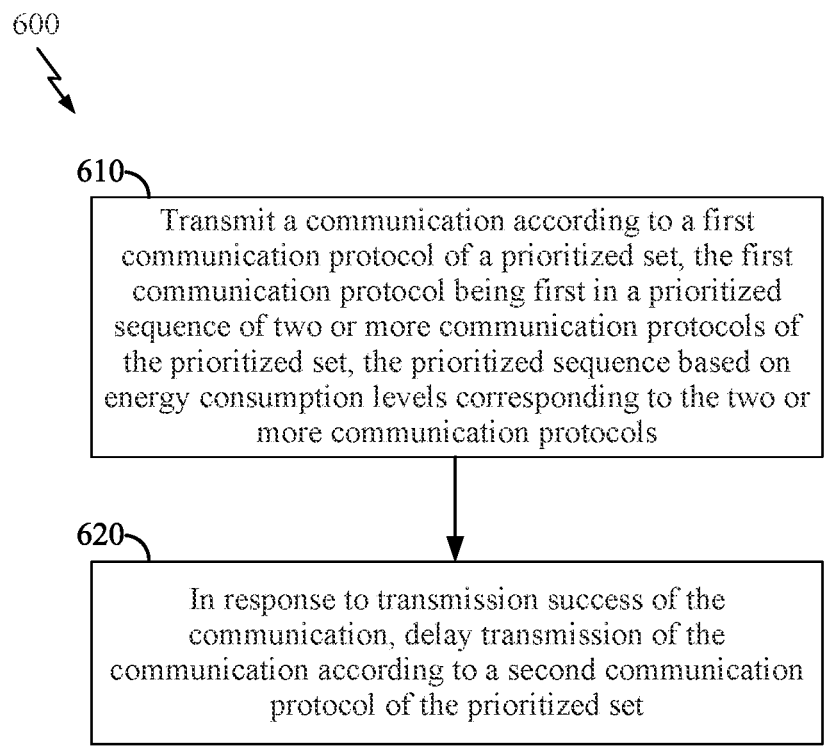
FIG. 6 is a flowchart of a process for prioritized communication based on energy consumption according to some embodiments.

FIG. 6 illustrates a process 600 for prioritized communication based on energy consumption. The process 600 is described below as being carried out by the power tool 101. However, in some embodiments, the process 600 is implemented by another system or tool having additional, fewer, and/or alternative components. For example, in some embodiments, the process 600 is implemented by the power tool battery pack 244. Additionally, although the blocks of the process 600 are illustrated in a particular order, in some embodiments, one or more of the blocks may be executed partially or entirely in parallel, may be executed in a different order than illustrated in FIG. 6.

In block 610, the electronic controller 210 may be configured to transmit a communication according to a first communication protocol of a prioritized set. For example, the prioritized set 110 may include two or more communication protocols in a prioritized sequence. In some examples, the prioritized set may be the default prioritized set 110 described above. In these examples, the prioritized set 110 may be applied to all areas in a map and without consideration of a location of the power tool 101. In some aspects, the electronic controller 210 may not update the prioritized set 110 based on the location of the power tool 101. In other aspects, the electronic controller 210 may update the prioritized set 110 (e.g., when the power tool 101 may support a new communication protocol, when the user may change the prioritized sequence of communication protocols in the prioritized set, etc.).

In some examples, the first communication protocol in the prioritized set 110 is first in the prioritized sequence of two or more communication protocols of the prioritized set. The prioritized sequence may be based on energy consumption levels corresponding to the two or more communication protocols. In some examples, the first communication protocol may be a communication protocol corresponding to the lowest energy consumption level in the prioritized set. For example, the prioritized set 110 may include three communication protocols (protocol 1: Bluetooth protocol, protocol 2: Wi-Fi protocol, and protocol 3: cellular protocol). Since protocol 1 consumes the least battery energy among the three communication protocols and protocol 3 consumes the most battery energy among the three communication protocols, the prioritized sequence of the prioritized set 110 is {protocol 1, protocol 2, protocol 3} where protocol 1 is first in the prioritized sequence. It should be appreciated that the types of protocols and the prioritized sequence are a mere example. The prioritized set 110 may include any other suitable protocol that the power tool 101 can support for communication. Also, the prioritized set 110 may include two or more communication protocols in any other suitable prioritized sequence based on energy consumption levels corresponding to the communication protocols. In this context, energy consumption for a protocol may be measured based on an energy amount consumed per transmission, an energy amount consumed over a period of time, an energy consumed for a particular type or set of transmissions, or the like.

In some examples, the transmission in block 610 is a result of a periodic multi-protocol communication scheme in which an instance of the communication is periodically transmitted using the communication protocols of the prioritized set at different intervals or frequencies for each protocol. For example, each communication protocol in the prioritized set 110 may be associated with a time counter of the time counters 238 (see FIG. 2). For example, the time counters 238 may include a first time counter for a first communication protocol, a second time counter for a second communication protocol, and so on. When the time counter for a particular communication protocol expires, the electronic controller 210 may transmit the communication according to that communication protocol. Accordingly, in some examples of the process 600, the electronic controller 210 may activate a time counter of each communication protocol in the prioritized set 110 (e.g., in advance of block 610). Then, in some examples of block 610, the transmission by the electronic controller 210 occurs in response the electronic controller 210 detecting expiration of the time counter associated with the first communication protocol.

In some examples, the time counter of a communication protocol may use a hardware or software timer to decrement at a fixed frequency or at a unit time (e.g., 1 millisecond, 1 second, etc.). When the time counter reaches a predetermined value (e.g., 0) or any other preset time or expiration threshold), the time counter may interrupt or notify the electronic controller 210 that the time counter expired (e.g., which may trigger the electronic controller 210 to communicate with a communication protocol corresponding to the time counter). In other examples, the time counter of a communication protocol may use a hardware or software timer to increment at a fixed frequency or at a unit time (e.g., 1 millisecond, 1 second, etc.). The time counter may regularly compare the time value of the time counter with the predetermined time value. When the time value of the time counter is equal to or greater than the predetermined time value (e.g., 5 minutes, 10 minutes, 1 hour, 24 hours, or any other suitable predetermined time value), the time counter may interrupt or notify the electronic controller 210 that the time counter expired (e.g., which may trigger the electronic controller 210 to communicate with a communication protocol corresponding to the time counter). Although the time counters 238 are illustrated separately from the electronic processor 220 and the memory 330 in FIG. 2, in some examples, the time counters 238 are implemented partially or entirely by the electronic processor 220 and/or the memory 330.

In some aspects, each time counter may have a different amount of time to elapse for utilizing a respective communication protocol. In some examples, the time counter of the first communication protocol being first in the prioritized sequence in the prioritized set has a shorter amount of time than the time counter of another communication protocol in the prioritized set. Another communication protocol may have lower priority than the first communication protocol in the prioritized sequence. In the example above, when the prioritized sequence of the prioritized set 110 is {protocol 1, protocol 2, protocol 3}, the time counter of protocol 1 may have the shortest amount of time while the time counter of protocol 3 may have the longest amount of time. Since communication according to protocol 3 consumes more battery energy than communication protocols 1 and 2, the electronic controller 210 may try to communicate according to protocol 3 less often than other communication protocols to preserve battery power. However, it should be understood that any other suitable amount of time may be set for each protocol. In some examples, the amount of time for a time counter may adaptively change based on the number of communication failures according to a communication protocol. For example, as the number of communication failures with protocol 1 increases, the time counter for protocol 1 can be longer (e.g., 1 minute to 2 minutes and to 5 minutes).

In some examples, the communication from the power tool 101 transmitted in response to a particular count timer expiring may include common information and protocol specific information. The common information may be included regardless of the communication protocol to be used by the power tool 101 to transmit the communication. The common information may include, for example, an identifier for the power tool 101, a current battery level of the power tool 101, status information for the power tool 101, location information for the power tool 101, or the like. The protocol specific information may be specific to the communication protocol used by the power tool 101 to transmit the communication (i.e., specific to the communication protocol associated with the count timer that expired). For example, the protocol specific information may include a location of the access point or any other suitable information for the communication protocol. Thus, in some examples, the communication (e.g., in block 610 and/or transmitted upon expiration of the time counters 238) may include at least some different information for a different communication protocol, although a portion of the message in the communication is the same as when sent using other communication protocols. In other examples, the communication does not include protocol specific information. For example, the communication does not change depending on the types of communication protocols.

In block 620, the electronic controller 210 may be configured to delay transmission of the communication according to a second communication protocol of the prioritized set 110 in response to transmission success of the communication according to the first communication protocol in the prioritized set 110. For example, when the electronic controller 210 successfully transmits the communication according to the first communication protocol, the electronic controller 210 may wait for an additional predetermined period of time to use a second communication protocol. For example, the electronic controller 210 may insert delay to the time counter of the second communication protocol in the prioritized set. Inserting delay may include, for example, resetting the time counter, subtracting time (from an incrementing time counter), adding time (to a decrementing or countdown time counter), or adjusting a timer expiration threshold. Thus, the electronic controller 210 may wait for an additional time to reach expiration of the time counter of the second communication protocol. Because the expiration of this time counter of the second communication protocol may trigger the transmission of the communication according to the second communication protocol, this additional time results in delayed transmission of the communication according to the second communication protocol.

In some examples, the electronic controller 210 may insert delay to all time counters of the time counters 238 or all time counters of the time counters 238 corresponding to communication protocols other than the first communication protocol that is used for the successful transmission of the communication. For example, in response to a determination that the communication was successful, the electronic controller 210 may reset (e.g., at zero for an incrementing timer or at an initial value for a decrementing timer) all of the time counters of the time counters 238 (in block 620). The time counters may then continue counting (e.g., incrementing or decrementing) and, in response to expiration of one of the time counters, the electronic controller 210 may again transmit the communication (e.g., returning to block 610). If all time counters are reset, the time counter with the shortest duration may expire first, resulting in the electronic controller 210 transmitting the communication according to the communication protocol associated with that time counter. Thus, in the case of the first communication protocol having the time counter with the shortest duration, the next transmission of the communication by the electronic controller 210 may be transmitted according to the first communication protocol.

In some aspects, the electronic controller 210 may identify transmission success of the communication according to the first communication protocol based on receipt, via the transceiver 240, of an acknowledgment. For example, after the electronic controller 210 transmits the communication, a receiving device (e.g., the server 150, a mobile phone, an access point of the network 140, or the like) can receive the communication (e.g., directly or via the network 140). When the receiving device successfully receives (e.g., decodes) the communication, the receiving device may send the acknowledgement to the power tool 101, indicating that the communication was successfully received. In some instances, the acknowledgment may be a bit having true of false values. In other instances, the acknowledgment may be any suitable number, symbol or other type to indicate the successful receipt of the communication. In some example, the acknowledgement may further indicate which communication protocol was used that resulted in the successful communication or where the communication protocol was used for the successful transmission of the communication (e.g., based on protocol-specific information received as part of the communication).

In some examples, the electronic controller 210 does not receive the acknowledgment after the transmission in block 610 and, rather, identifies expiration of the time counter of the second communication protocol in the prioritized set 110. For example, because the acknowledgment is not received, the electronic controller 210 does not insert delay into the time counter of the second communication protocol. Thus, ultimately, the time counter of the second communication protocol expires (e.g., after one or more unsuccessful transmissions of the communication according to the first communication protocol). Then, the electronic controller 210 may transmit, via the transceiver 240, the communication according to the second communication protocol of the prioritized set. Here, the second communication protocol may have a lower priority than the first communication protocol in the prioritized sequence. Also, the time counter of the second communication protocol may have, for example, a longer amount of time to expire. In some examples, the electronic controller 210 may reset the time counter of the second communication protocol after, or otherwise based on, transmitting the communication according to the second communication protocol. In such scenarios, before the time counter of the second communication protocol expires again, the time counter of the first communication protocol may expire first. Then, the electronic controller 210 may transmit the communication according to the first communication protocol again (e.g., as part of again executing block 610 and restarting the process 600). Additionally, in some examples, the electronic controller 210 may be configured to delay transmission of the communication according to a third communication protocol of the prioritized set 110 in response to transmission success of the communication according to the second communication protocol in the prioritized set 110. For example, in response to a determination of transmission success of the communication according to the second protocol, the electronic controller 210 may reset, or otherwise insert delay to, all of the time counters of the time counters 238.

In some examples, the electronic controller 210 does not receive an acknowledgment of a successful transmission for the first or second communication protocol and, rather, identifies expiration of the time counter of the third communication protocol in the prioritized set 110. For example, because an acknowledgment is not received, the electronic controller 210 does not insert delay into the time counter of the third communication protocol. Thus, ultimately, the time counter of the third communication protocol expires (e.g., after one or more unsuccessful transmissions of the communication according to the first communication protocol and/or the second communication protocol). Then, the electronic controller 210 may transmit, via the transceiver 240, the communication according to the third communication protocol of the prioritized set. Here, the third communication protocol may have lower priority than the second communication protocol in the prioritized sequence. In some examples, the electronic controller 210 may reset the time counter of the third communication protocol after, or otherwise based on, transmitting the communication according to the third communication protocol. In such scenarios, before the time counter of the third communication protocol expires again, the time counter of the first (and/or second) communication protocol may expire first. Then, the electronic controller 210 may transmit the communication according to the first (and/or second) communication protocol again. Additionally, in some examples, the electronic controller 210 may be configured to delay transmission of the communication according to a further communication protocols of the prioritized set 110 in response to transmission success of the communication according to the third communication protocol in the prioritized set 110. For example, in response to a determination of transmission success of the communication according to the third protocol, the electronic controller 210 may reset, or otherwise insert delay to, all of the time counters of the time counters 238.

In some examples, a communication event may occur independent of the time counter (e.g., based on a spontaneous request from a user, a request from the server 150, or an unrelated tool event). When a communication event is triggered, the electronic controller 210 may try to communicate according to the first communication protocol being first in the prioritized set 110 without waiting for the expiration of the time counter corresponding to the first communication protocol. This transmission may be the transmission of the communication in block 610 of the process 600. Additionally or alternatively, based on the communication event or the communication attempt, the electronic controller 210 may activate or reset a time counter of each communication protocol in the prioritized set 110. By activating (or resetting) the time counters, the periodic multi-protocol communication scheme may be started (or restarted), which may cause the start of the process 600 (e.g., when the expiration of the first time counter resulting in transmission of the communication in block 610).

Figure 7:
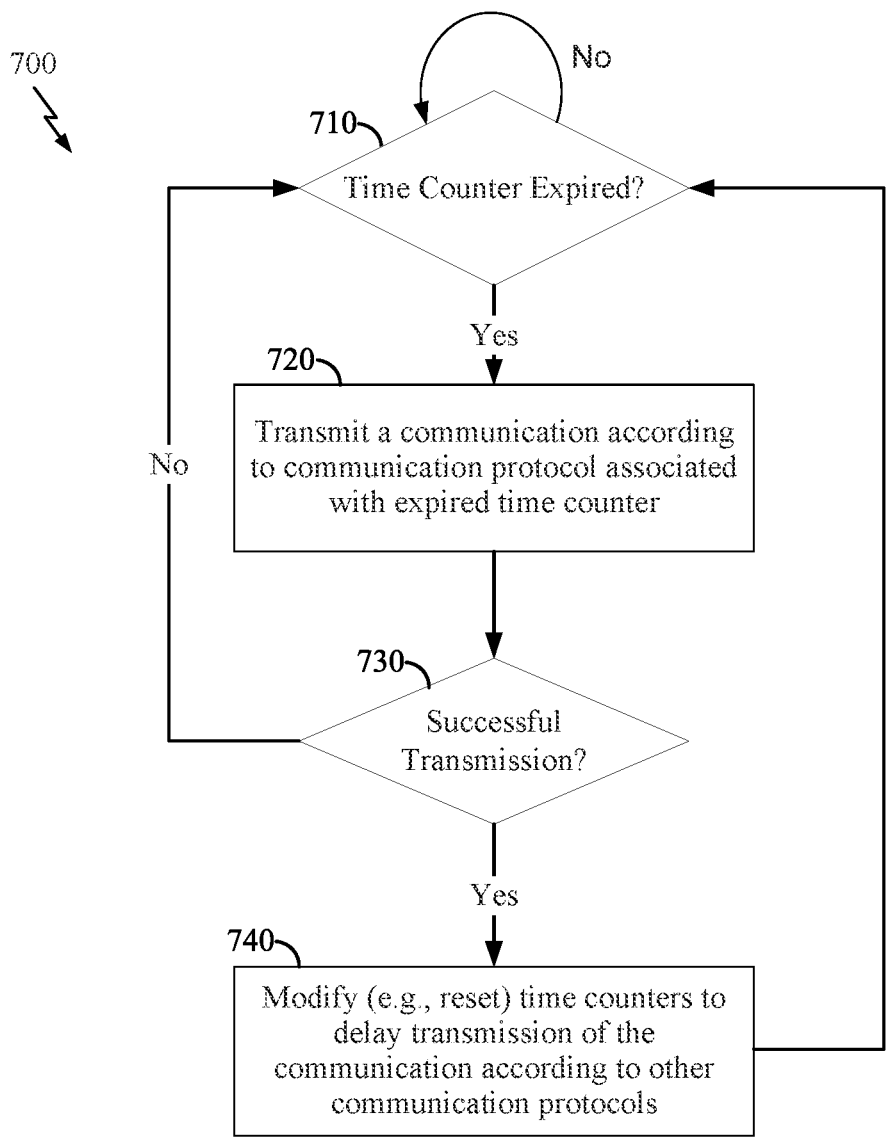
FIG. 7 is another flowchart of a process for prioritized communication based on energy consumption.

FIG. 7 illustrates a process 700 for prioritized communication based on energy consumption. The process 700 is described below as being carried out by the power tool 101. However, in some embodiments, the process 700 is implemented by another system or tool having additional, fewer, and/or alternative components. For example, in some embodiments, the process 700 is implemented by the power tool battery pack 244. Additionally, although the blocks of the process 700 are illustrated in a particular order, in some embodiments, one or more of the blocks may be executed partially or entirely in parallel, may be executed in a different order than illustrated in FIG. 7. In some examples, the power tool 101 (or other device) implements the process 600 of FIG. 6 by executing the process 700.

In block 710, the electronic controller 210 determines whether one (or any one) of the time counters 238 has expired. The electronic controller 210 may determine whether one of the time counters 238 expired using one of the above-described techniques (e.g., described with respect to block 610 of FIG. 6). The electronic controller 210 may continue to execute block 710 (e.g., periodically) until determining that one of the time counters 238 has expired. In response to determining that one of the time counters 238 has expired, the electronic controller 210 may proceed to block 720.

In block 720, the electronic controller 210 may transmit a communication according to a communication protocol that is associated with the time counter of the time counters 238 that the electronic controller 210 determined had expired in the previous block 710. For example, as described with respect to block 610, initially, the communication protocol may be the highest priority communication protocol in a prioritized set, which may be associated with the time counter of the time counters 238 having the shortest duration. The prioritized sequence of communication protocols in the prioritized set may be based on energy consumption levels corresponding to the two or more communication protocols. As described with respect to the process 600 of FIG. 6, the lower energy consuming communication protocols may be associated with a higher priority in the prioritized sequence. The electronic controller 210 may transmit the communication using similar techniques as described above with respect to block 610 of FIG. 6. In some examples, the electronic controller 210 may also reset the time counter of the time counters 230 that expired upon transmitting the communication in block 720.

In block 730, the electronic controller 210 may determine whether the transmission of the previous step 720 was successful. The electronic controller 210 may make this determination using similar techniques as described above with respect to block 620 of FIG. 6. When the electronic controller 210 determines that the transmission was not successful (e.g., based on not receiving an acknowledgement), the electronic controller 210 may return to block 710 to await the next determination that one of the time counters 238 has expired (which may be the same time counter or another time counter of the time counters 238). When the electronic controller 210 determines that the transmission was successful, the electronic controller 210 may proceed to block 740.

In block 740, the electronic controller 210 may modify the time counters 238 to delay transmission of the communication according to other communication protocols of the prioritized sequence of communication protocols. In some examples, to modify the time counters 238, the electronic controller 210 resets each of the time counters 238. In other examples, to modify the time counters 238, the electronic controller 210 adds time (in the case of decrementing time counters 238) or subtracts time (in the case of incrementing time counters 238) to introduce the delay. After modifying the time counters 238, the electronic controller 210 returns to block 710 to again await expiration of one of the time counters 238.

Accordingly, by associating a time counter of the time counters 238 with each communication protocol of a prioritized set, where the higher priority communication protocols have a shorter duration time counter than the lower priority communication protocols, and executing the process 700, the electronic controller 210 may implement a prioritized communication scheme that (i) reduces redundant communications transmitted over multiple communication protocols, and (ii) prioritizes communications that consume less energy over communications that consume more energy. Thus, with this technique, power to successfully transmit a communication by a device (e.g., the power tool 101 or power tool battery pack 244) may be reduced.

As noted above, although the processes 300, 400, 500, 600, and 700 of FIGS. 3-7, respectively, are described with respect to a power tool 101 communicating, or attempting to communicate, the processes 300, 400, 500, 600, and 700 may similarly be executed by a power tool battery pack, which may also have communication capabilities. The term power tool device may be used to refer to a power tool (e.g., the power tool 101), whether motorized or non-motorized, and/or to refer to a power tool battery pack (e.g., the power tool battery pack 244) that can attach to and power a power tool. Accordingly, the processes 300, 400, 500, 600, 700 may also be described as being executed by a power tool device.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first." "second." etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover:

a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A power tool device for prioritized communication, comprising:
an electronic controller including a processor and a memory; and
a transceiver communicatively coupled to the electronic controller; and
wherein the electronic controller is configured to:
assign a first geographic area to a first prioritized set of communication protocols based on a prior successful transmission in the first geographic area using a first communication protocol;
determine a power tool location of the power tool device, wherein the power tool location is within the first geographic area;
identify the first prioritized set of communication protocols corresponding to the power tool location, the first prioritized set of communication protocols including two or more communication protocols in a prioritized sequence; and
transmit, via the transceiver, a communication according to the first communication protocol of the first prioritized set of communication protocols, the first communication protocol being first in the prioritized sequence.

2. The power tool device of claim 1, wherein the electronic controller is further configured to:
identify transmission failure of the communication according to the first communication protocol; and
transmit, via the transceiver, the communication according to a second communication protocol of the first prioritized set of communication protocols, the second communication protocol having lower priority than the first communication protocol in the prioritized sequence.

3. The power tool device of claim 2, wherein the electronic controller is further configured to:
identify transmission success of the communication according to the second communication protocol; and
update the first prioritized set of communication protocols corresponding to the power tool location such that the second communication protocol has higher priority than the first communication protocol in the first prioritized set of communication protocols corresponding to the power tool location.

4. The power tool device of claim 1, wherein the first prioritized set is a default prioritized set of communication protocols, and wherein the electronic controller is further configured to:
determine a new prioritized set of communication protocols, the new prioritized set of communication protocols including two or more communication protocols in a further prioritized sequence,
determine a geographic area corresponding to the new prioritized set of communication protocols, and
assign the new prioritized set of communication protocols to the geographic area.

5. The power tool device of claim 1, wherein a first area corresponding to the first prioritized set of communication protocols corresponds to a communication protocol having a highest priority in the first prioritized set of communication protocols.

6. The power tool device of claim 1, wherein a first area corresponding to the first prioritized set of communication protocols and a second area corresponding to a second prioritized set of communication protocols overlap, and
wherein an area in an overlapping area between the first area and the second area corresponds to at least one of: the first prioritized set or the second prioritized set.

7. The power tool device of claim 6, wherein the electronic controller is further configured to:
define an interpolated boundary within the overlapping area between the first area and the second area; and
select the first prioritized set or the second prioritized set based on the first geographic area with respect to the interpolated boundary.

8. The power tool device of claim 1, wherein the power tool device further comprises a motor for driving a tool implement and a power tool battery pack interface for receiving a power tool battery pack.

9. The power tool device of claim 1, wherein the power tool device comprises a power tool battery pack and a power tool interface for receiving a power tool.

10. The power tool device of claim 1, wherein the electronic controller is further configured to:
define the first geographic area as a distance surrounding a communication source corresponding to the first communication protocol.

11. A method for prioritized communication, comprising:
assigning a first geographic area to a first prioritized set of communication protocols based on a prior successful transmission in the first geographic area using the first communication protocol;
determining a power tool location of a power tool device, wherein the power tool location is within the first geographic area;
identifying the first prioritized set of communication protocols corresponding to the power tool location, the first prioritized set of communication protocols including two or more communication protocols in a prioritized sequence; and
transmitting a communication according to a first communication protocol of the first prioritized set of communication protocols, the first communication protocol being first in the prioritized sequence.

12. The method of claim 11, further comprising:
identifying transmission failure of the communication according to the first communication protocol; and
transmitting the communication according to a second communication protocol of the first prioritized set of communication protocols, the second communication protocol having lower priority than the first communication protocol in the prioritized sequence.

13. The method of claim 12, further comprising:
identifying transmission success of the communication according to the second communication protocol; and
updating the first prioritized set of communication protocols corresponding to the power tool location such that the second communication protocol has higher priority than the first communication protocol in the first prioritized set of communication protocols corresponding to the power tool location.

14. The method of claim 11, wherein the first prioritized set is a default prioritized set of communication protocols, the method further comprising:
determining a new prioritized set of communication protocols, the new prioritized set of communication protocols including two or more communication protocols in a further prioritized sequence,
determining a geographic area corresponding to the new prioritized set of communication protocols, and
assigning the new prioritized set of communication protocols to the geographic area.

15. The method of claim 11, wherein a first area corresponding to the first prioritized set of communication protocols corresponds to a communication protocol having a highest priority in the first prioritized set of communication protocols.

16. The method of claim 11, wherein a first area corresponding to the first prioritized set of communication protocols and a second area corresponding to a second prioritized set of communication protocols overlap, and
wherein an area in an overlapping area between the first area and the second area corresponds to at least one of: the first prioritized set or the second prioritized set.

* * * * *